US009909659B2

(12) United States Patent
Bessho et al.

(10) Patent No.: US 9,909,659 B2
(45) Date of Patent: Mar. 6, 2018

(54) WORK VEHICLE

(71) Applicant: Kubota Corporation, Osaka-shi (JP)

(72) Inventors: Hiroki Bessho, Sakai (JP); Noriyasu Honjo, Sakai (JP); Jun Yoshida, Sakai (JP); Hiroshi Takagi, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/157,512

(22) Filed: May 18, 2016

(65) Prior Publication Data

US 2017/0002920 A1 Jan. 5, 2017

(30) Foreign Application Priority Data

Jul. 2, 2015 (JP) .................................. 2015-133949

(51) Int. Cl.
| F16H 57/04 | (2010.01) |
| F16H 57/027 | (2012.01) |
| F16H 9/18 | (2006.01) |
| F16H 57/035 | (2012.01) |
| B62J 13/00 | (2006.01) |
| F16D 1/00 | (2006.01) |
| F16H 57/02 | (2012.01) |

(52) U.S. Cl.
CPC ............. *F16H 57/027* (2013.01); *F16H 9/18* (2013.01); *F16H 57/035* (2013.01)

(58) Field of Classification Search
CPC ............. F16H 57/0489; F16H 57/0415; F16H 57/035; F16H 2057/0203; F16H 57/0416
USPC .................... 474/93, 144; 180/68.1
See application file for complete search history.

(56) References Cited

U.S. PATENT DOCUMENTS

| 4,531,928 A * | 7/1985 | Ikenoya ................... B62M 9/06 180/229 |
| 4,631,977 A * | 12/1986 | Kawashima ............. B62M 9/06 474/150 |
| 4,671,782 A * | 6/1987 | Ochiai ..................... B62M 7/06 474/93 |
| 4,697,665 A * | 10/1987 | Eastman .................. B62K 5/01 123/195 C |
| 6,238,312 B1 * | 5/2001 | Tsubata ................. F16H 37/021 474/144 |
| 6,267,700 B1 * | 7/2001 | Takayama ............... F02B 61/02 474/144 |
| 6,544,134 B2 * | 4/2003 | Ohyama .................. B62M 7/12 474/144 |
| 6,557,438 B2 * | 5/2003 | Maeda ................... F01M 13/00 184/6.12 |

(Continued)

FOREIGN PATENT DOCUMENTS

JP 201251505 A 3/2012

*Primary Examiner* — Henry Y Liu
(74) *Attorney, Agent, or Firm* — The Webb Law Firm

(57) ABSTRACT

A work vehicle includes a stepless speed changer device having a drive pulley receiving input of power of an engine, a driven pulley, and an endless rotary body wound around and entrained between the drive pulley and the driven pulley and an accommodating body having an accommodation space for accommodating the drive pulley, the driven pulley and the endless rotary body. The accommodation space includes an air passage for causing air introduced from the outside to flow from the driven pulley side to the drive pulley side to be eventually discharged to the outside.

6 Claims, 8 Drawing Sheets

(56) References Cited

U.S. PATENT DOCUMENTS

| | | | | |
|---|---|---|---|---|
| 6,820,708 | B2* | 11/2004 | Nakamura | F16H 57/0489 180/296 |
| 6,938,676 | B2* | 9/2005 | Lan | F16H 57/0489 165/41 |
| 6,971,438 | B2* | 12/2005 | Oki | F01P 3/18 123/196 AB |
| 7,281,596 | B2* | 10/2007 | Fukuda | F16H 57/0415 180/376 |
| 7,303,495 | B2* | 12/2007 | Schoenek | F16C 35/067 384/542 |
| 7,316,626 | B2* | 1/2008 | Oishi | B62M 7/02 123/195 A |
| 7,427,248 | B2* | 9/2008 | Chonan | F16H 57/05 474/150 |
| 7,556,576 | B2* | 7/2009 | Mochizuki | F16H 9/18 474/18 |
| 7,562,739 | B2* | 7/2009 | Lan | B62K 5/01 180/339 |
| 7,686,123 | B2* | 3/2010 | Ishida | B62K 11/04 180/219 |
| 7,771,299 | B2* | 8/2010 | Mochizuki | F16H 9/18 180/229 |
| 7,882,911 | B2* | 2/2011 | Nobuhira | B62M 7/02 180/229 |
| 8,202,181 | B2* | 6/2012 | Oishi | B62M 7/02 474/144 |
| 8,256,563 | B2* | 9/2012 | Suzuki | B60K 5/02 180/292 |
| 8,323,134 | B2* | 12/2012 | Tsukada | F16H 61/66259 474/144 |
| 8,382,620 | B2* | 2/2013 | Morita | F16H 9/18 474/13 |
| 8,556,015 | B2* | 10/2013 | Itoo | B60K 11/08 180/68.1 |
| 8,827,020 | B2* | 9/2014 | Deckard | B60K 17/08 180/68.1 |
| 8,834,307 | B2* | 9/2014 | Itoo | F16H 57/0416 474/93 |
| 8,840,496 | B2* | 9/2014 | Yamanishi | B60K 11/08 180/68.1 |
| 9,103,428 | B2* | 8/2015 | Takahashi | F16H 57/025 |
| 9,140,340 | B2* | 9/2015 | Lai | F16H 57/0416 |
| 9,341,255 | B2* | 5/2016 | Itoo | F16H 57/0489 |
| 9,528,595 | B2* | 12/2016 | Itoo | F16H 57/031 |
| 2003/0066696 | A1* | 4/2003 | Nakamura | B62K 5/01 180/68.1 |
| 2004/0171449 | A1* | 9/2004 | Oishi | B62M 7/02 474/144 |
| 2004/0224806 | A1* | 11/2004 | Chonan | F16H 57/0415 474/93 |
| 2005/0239591 | A1* | 10/2005 | Schoenek | F16C 35/067 474/144 |
| 2005/0239592 | A1* | 10/2005 | Schoenek | B62J 13/00 474/144 |
| 2005/0272544 | A1* | 12/2005 | Ho | F16H 57/031 474/144 |
| 2006/0154761 | A1* | 7/2006 | Brown | F16H 55/56 474/28 |
| 2006/0270503 | A1* | 11/2006 | Suzuki | F16H 57/0489 474/144 |
| 2008/0032841 | A1* | 2/2008 | Oishi | B62M 7/02 474/242 |
| 2008/0314676 | A1* | 12/2008 | Ishida | B62K 11/04 180/366 |
| 2009/0183937 | A1* | 7/2009 | Yamamura | B60K 13/04 180/89.2 |
| 2010/0155170 | A1* | 6/2010 | Melvin | B60K 11/08 180/339 |
| 2010/0167853 | A1* | 7/2010 | Morita | F16H 9/18 474/13 |
| 2011/0220429 | A1* | 9/2011 | Yamamura | B60K 11/00 180/68.1 |
| 2012/0031693 | A1* | 2/2012 | Deckard | F16H 57/0416 180/68.3 |
| 2012/0289370 | A1* | 11/2012 | Yamanishi | B60K 11/08 474/93 |
| 2013/0087403 | A1* | 4/2013 | Itoo | F16H 57/0416 180/339 |
| 2013/0090198 | A1* | 4/2013 | Itoo | F16H 57/03 474/93 |
| 2015/0024890 | A1* | 1/2015 | Eberhardt | F16H 57/0416 474/144 |

* cited by examiner

WORK VEHICLE

CROSS-REFERENCE TO RELATED APPLICATION

This application claims priority to Japanese Patent Application No. 2015-133949 filed Jul. 2, 2015, the disclosure of which is hereby incorporated in its entirety by reference.

BACKGROUND OF THE INVENTION

Field of the Invention

The present invention relates to a work vehicle.

Description of the Related Art

A conventional work vehicle is disclosed in e.g. Japanese Unexamined Patent Application Publication No. 2012-51505. The conventional work vehicle includes a stepless speed changer device having a drive pulley ("a drive rotary body" in this document) receiving input of power of an engine, a driven pulley ("a driven rotary body" in the document), and an endless rotary body wound around and entrained between the drive pulley and the driven pulley. The work vehicle further includes an accommodating body ("a "speed changer case", etc. in the document) having an accommodation space for accommodating the drive pulley, the driven pulley and the endless rotary body (an "endless belt" in the document).

When the stepless speed changer device is driven, heat due to friction is generated between the drive rotary body and the endless rotary body and also between the driven rotary body and the endless rotary body. For discharging this heat, in the accommodation space of the accommodating body, there is provided an air passage for causing air introduced from the outside to flow from the drive pulley side to the driven pulley side to be eventually discharged to the outside.

However, with the above-described conventional technique, due to e.g. presence of a structural object(s) obstructive to the introduction of air into the accommodation space, there was a tendency of the amount of cooling air drawn into the accommodation space being relatively small. For this reason, there would tend to occur shortage of amount of air in the air passage of the accommodation space, thus insufficient cooling of the stepless speed changer device.

In view of the above respect, there has been a need for a work vehicle capable of effecting cooling of a stepless speed changer device in a favorable manner.

SUMMARY OF THE INVENTION

A work vehicle according to the present invention comprises:

an engine;

a stepless speed changer device having a drive pulley receiving input of power of the engine, a driven pulley, and an endless rotary body wound around and entrained between the drive pulley and the driven pulley; and an accommodating body having an accommodation space for accommodating the drive pulley, the driven pulley and the endless rotary body;

wherein the accommodation space includes an air passage for causing air introduced from the outside to flow from the driven pulley side to the drive pulley side to be eventually discharged to the outside.

With the above-described arrangement of the present invention, the accommodation space provided in the accommodation body accommodates therein the drive pulley, the driven pulley and the endless rotary body of the stepless speed changer device. And, in this accommodation space, there is provided an air passage for causing air introduced from the outside to flow from the driven pulley side to the drive pulley side to be eventually discharged to the outside. On the driven pulley side, the number of structural objects obstructive to the air introduction is relatively small, so that from this driven pulley side, a large amount of cooling air can be introduced into the accommodation space. Therefore, the amount of air introduced into the accommodation space is increased, so that the amount of air present in the air passage of the accommodation space can be sufficient. Thus, heat generated in the stepless speed changer device can be discharged effectively and efficiently. As a result, deterioration such as frictional wear will occur less likely in e.g. the endless belt, so that the service life of the stepless speed changer device can be extended.

In this way, according to the present invention, cooling of a stepless speed changer device can be effected in a favorable manner.

In the present invention, preferably:

adjacent the driven pulley inside the accommodating body, there is provided an inlet capable of introducing air from the outside into the accommodation space;

the work vehicle further comprises a fin disposed adjacent the inlet and capable of generating an air current flowing from the outside to the accommodation space in association with rotational drive of the driven pulley.

With the above-described arrangement, as the fin is rotatably driven in association with rotational drive of the driven pulley, there is generated an air current flowing toward the accommodation space, whereby air is introduced via the inlet adjacent the driven pulley into the accommodation space. As the fin is disposed adjacent the inlet, with the air current generated by this fin, cooling air can be introduced vigorously toward the driven pulley inside the accommodation space.

In the present invention, preferably, the work vehicle further comprises:

a driving section having a driver's seat; and an air introducing member connected to the inlet;

wherein an air introducing opening included in the air introducing member is disposed at a portion rearwardly of the driver's seat.

With the above-described arrangement, at a portion rearwardly of the driver's seat in the driving section, obstructive objects are present, so the possibility of mixing of dust or the like into the air is relatively small. Thus, air present in this rear portion of the driver's seat is introduced via the air introducing opening and guided to the air introducing member to be eventually fed into the inlet. Therefore, intrusion of dust or the like into the accommodation space is suppressed, and adhesion of the dust or the like to the stepless speed changer can be avoided advantageously.

In the present invention, preferably:

the accommodating body includes a first discharge opening capable of discharging air from the accommodation space to the outside; and the first discharge opening is disposed on a side opposite the driven pulley relative to the drive pulley.

With the above-described arrangement, air having flown from the driven pulley side to the drive pulley side in the accommodation space of the accommodating body is discharged via the first discharge opening disposed on the side opposite the drive pulley. In this way, as the first discharge opening is provided along the flow of air in the accommodation space, air can flow smoothly in the air passage of the accommodation space.

In the present invention, preferably, the work vehicle further comprises:

an air drawing member connected to the first discharge opening;

wherein the air drawing member includes an air drawing opening at an end opposite the first discharge opening, the air drawing opening being opened toward an oil pan of the engine.

With the above-described arrangement, air discharged through the first discharge opening is guided by the air drawing member and then blown through the air drawing opening toward the oil pan of the engine. With this, by air which has cooled the stepless speed changer device, it is possible to cool the engine oil reserved in the oil pan of the engine which has a higher temperature than the stepless speed changer device. As a result, it becomes possible to omit an oil cooler for cooling engine oil, so that reduction in the number of components is made possible.

In the present invention, preferably:

the accommodating body includes an accommodating case for accommodating the drive pulley, the drive pulley and the endless rotary body, and a clutch case communicated to the accommodating case and configured to accommodate a centrifugal clutch capable of engaging/disengaging transmission of power of the engine to the drive pulley; and the first discharge opening is provided in the clutch case.

With the above-described arrangement, through utilization of a clutch case accommodating a centrifugal clutch capable of engaging/disengaging transmission of power of the engine to the drive pulley, there is provided the first discharge opening for discharging air from the accommodation space to the outside. With this, cooling air in the accommodation space flowing from the driven pulley side to the drive pulley side is caused to come into full contact with the drive pulley inside the accommodating case and then to be discharged via the first discharge opening of the clutch case communicated to the accommodation space.

In the present invention, preferably:

at a portion of the accommodating body located between the drive pulley and the driven pulley, there is provided a second discharge opening separately of the first discharge opening, the second discharge opening being capable of discharging air from the accommodation space to the outside.

With the above-described arrangement, a large amount of air is introduced into the accommodation space. Therefore, by providing a second discharge opening as a discharge opening for discharging air from the accommodation space to the outside, in addition to the first discharge opening, there can be obtained favorable balance between air intake and air outlet. And, as this second discharge opening is provided at a portion of the accommodating body located between the drive pulley and the driven pulley, an excess amount of air present in the accommodation space can be discharged via the second discharge opening, and reverse flow of the air via the inlet of the accommodation space can be avoided.

DETAILED DESCRIPTION OF THE PREFERRED EMBODIMENTS

Next, an embodiment of the present invention will be explained.

Figure 1:
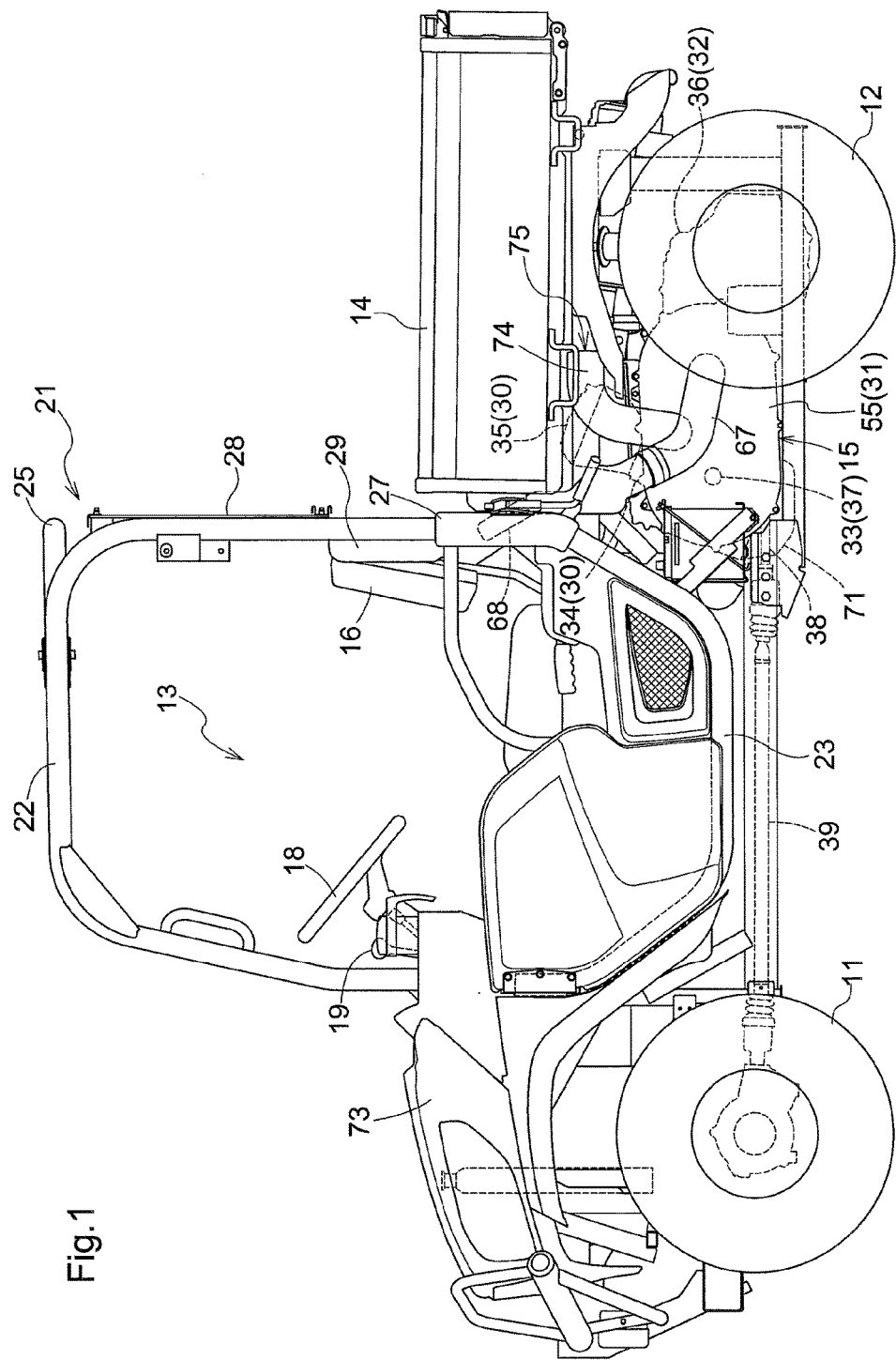
FIG. 1 is a side view showing a multi-purpose vehicle.
Figure 2:
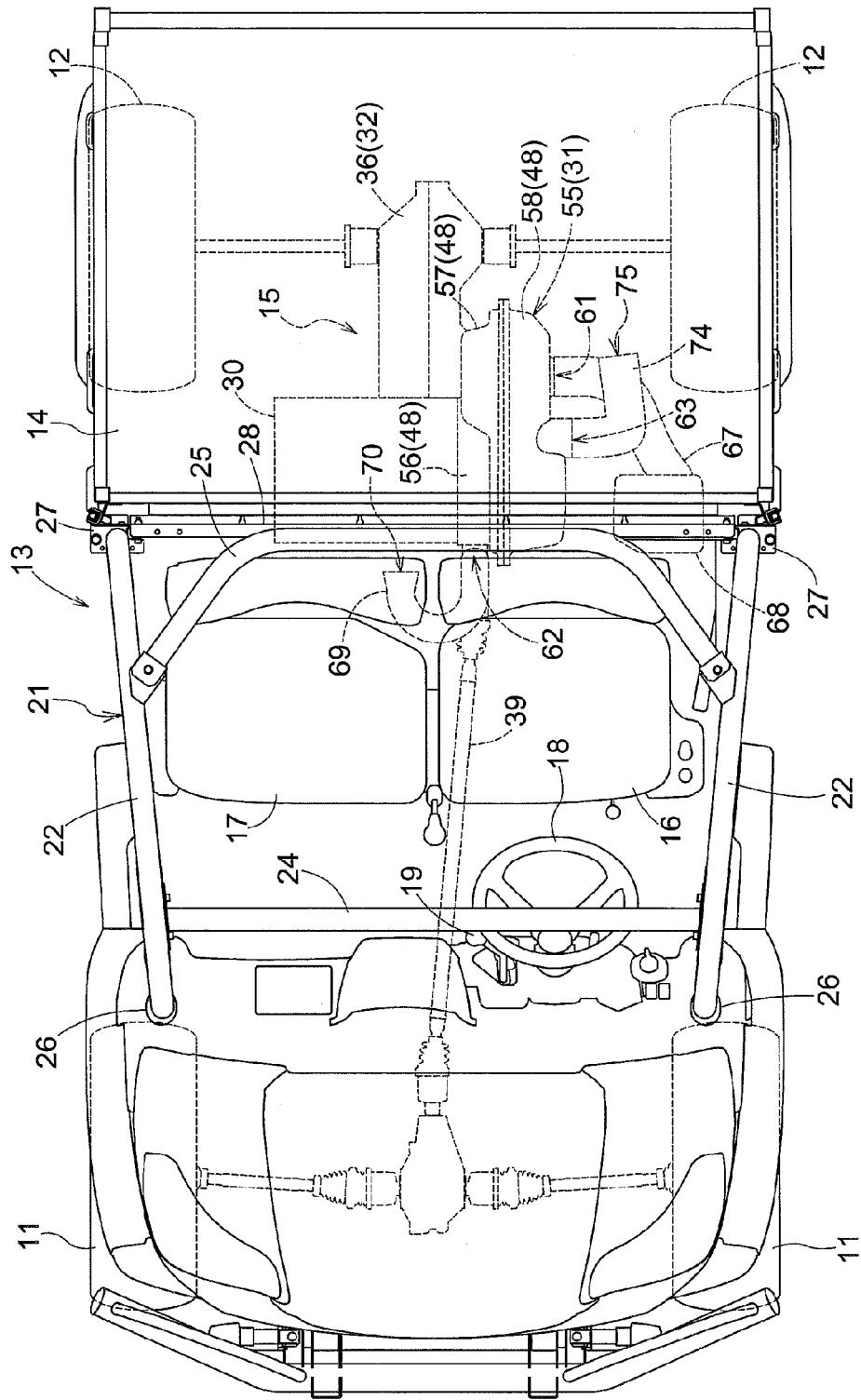
FIG. 2 is a plan view showing the multi-purpose vehicle.

A multi-purpose vehicle (an example of "work vehicle") shown in FIG. 1 and FIG. 2 is a vehicle for multiple purposes such as load transporting, leisure activity, etc. This multi-purpose vehicle includes a pair of left and right steerable and drivable front wheels 11, a pair of left and right drivable rear wheels 12, and a traveling vehicle body that can travel by the left and right front wheels 11 and the left and right rear wheels 12. At a front-rear center portion of the traveling vehicle body, a driving section 13 is provided. Rearwardly of the driving section 13 of the traveling vehicle body, a load-carrying platform 14 is provided. Downwardly of the load-carrying platform 14 in the traveling vehicle body, an engine section 15 is provided.

In the driving section 13, there are provided a driver's seat 16 at which an operator can be seated, an auxiliary seat 17 at which a passenger can be seated, a steering wheel 18 for effecting a steering operation, a speed changer lever 19 for effecting speed changing operation, an accelerator pedal (not shown) for changing the speed of the traveling vehicle body, etc.

Figure 6:
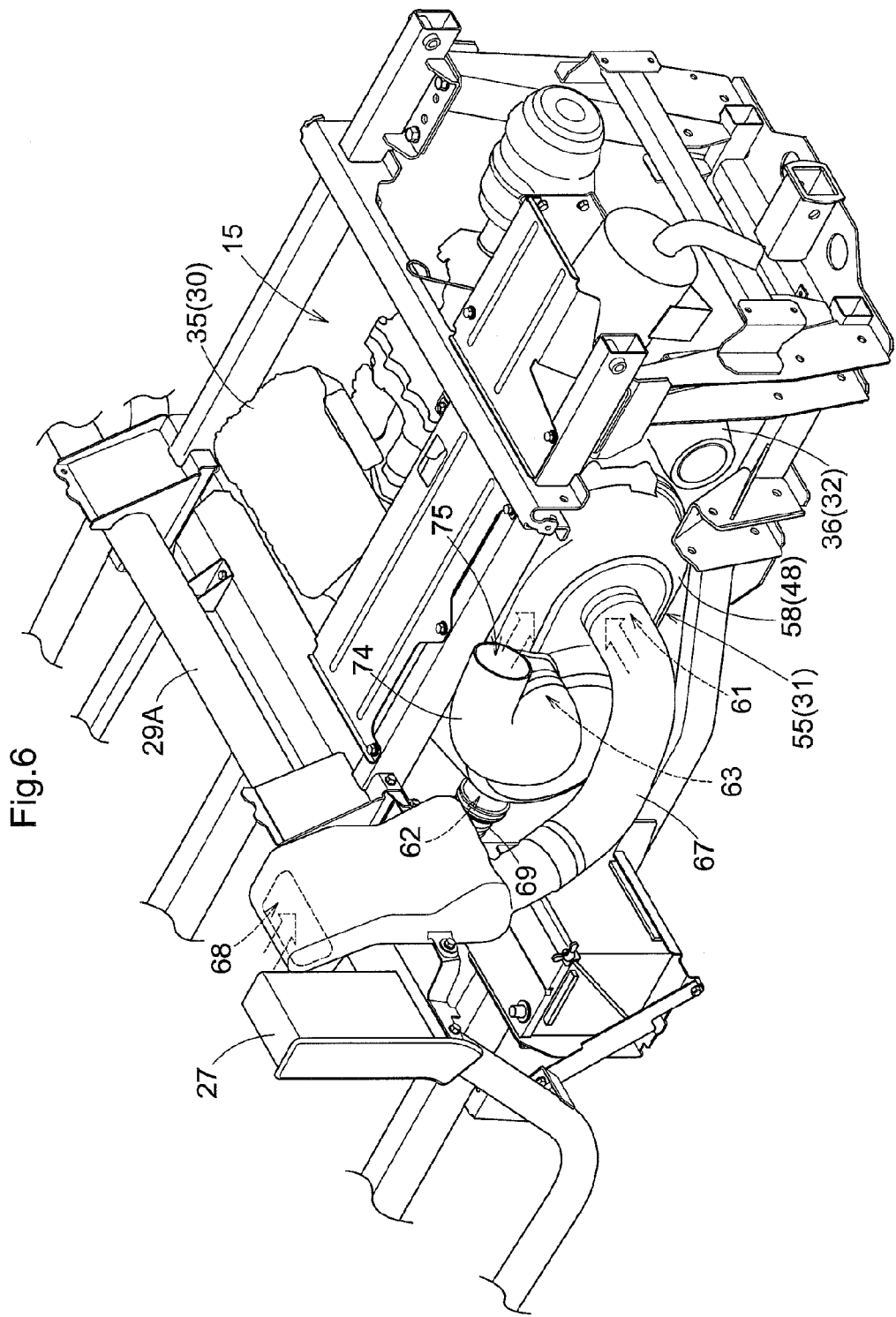
FIG. 6 is a perspective view showing the belt type stepless speed changer mechanism and its periphery.
Figure 7:
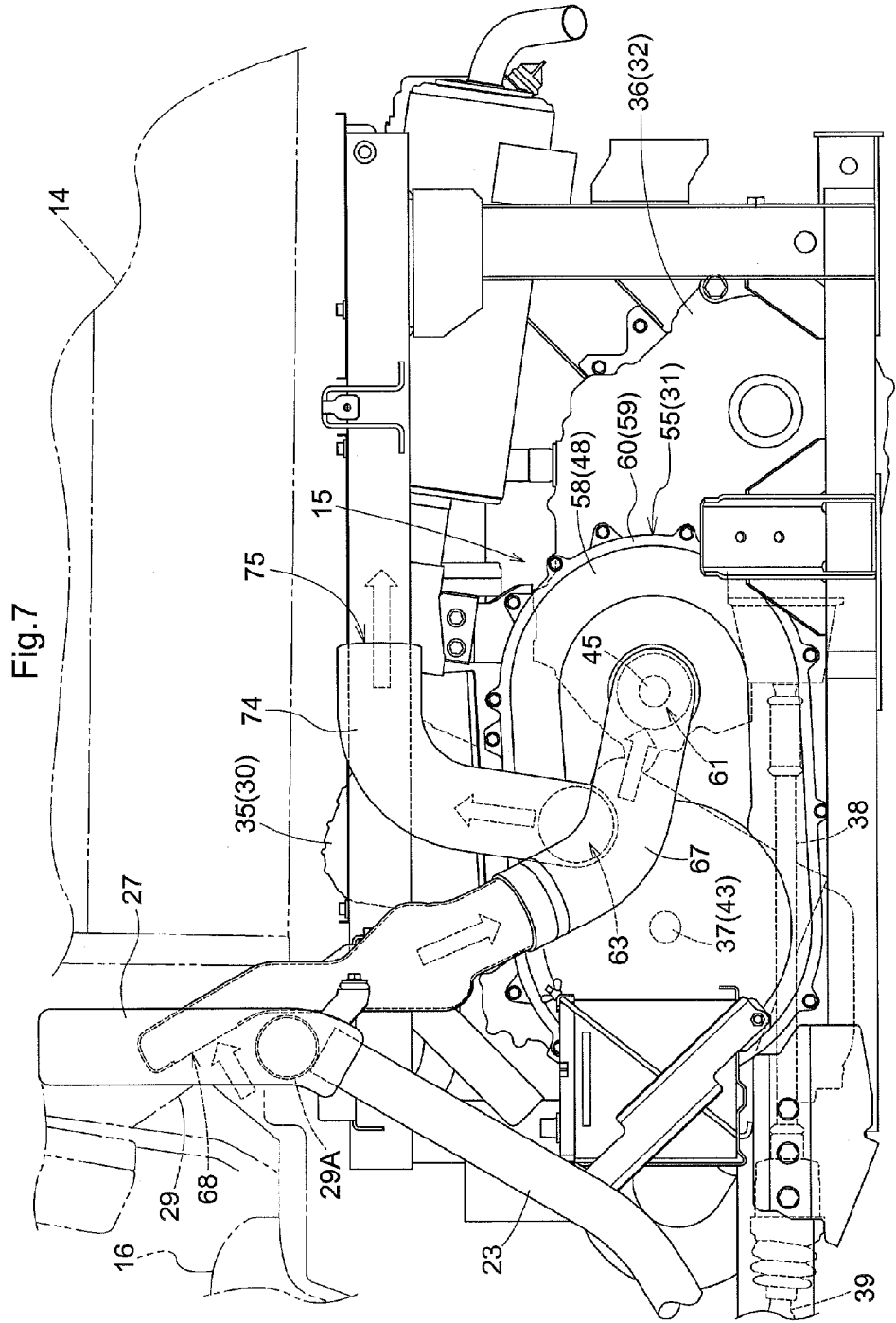
FIG. 7 is a side view showing the belt type stepless speed changer mechanism and its periphery.
Figure 8:
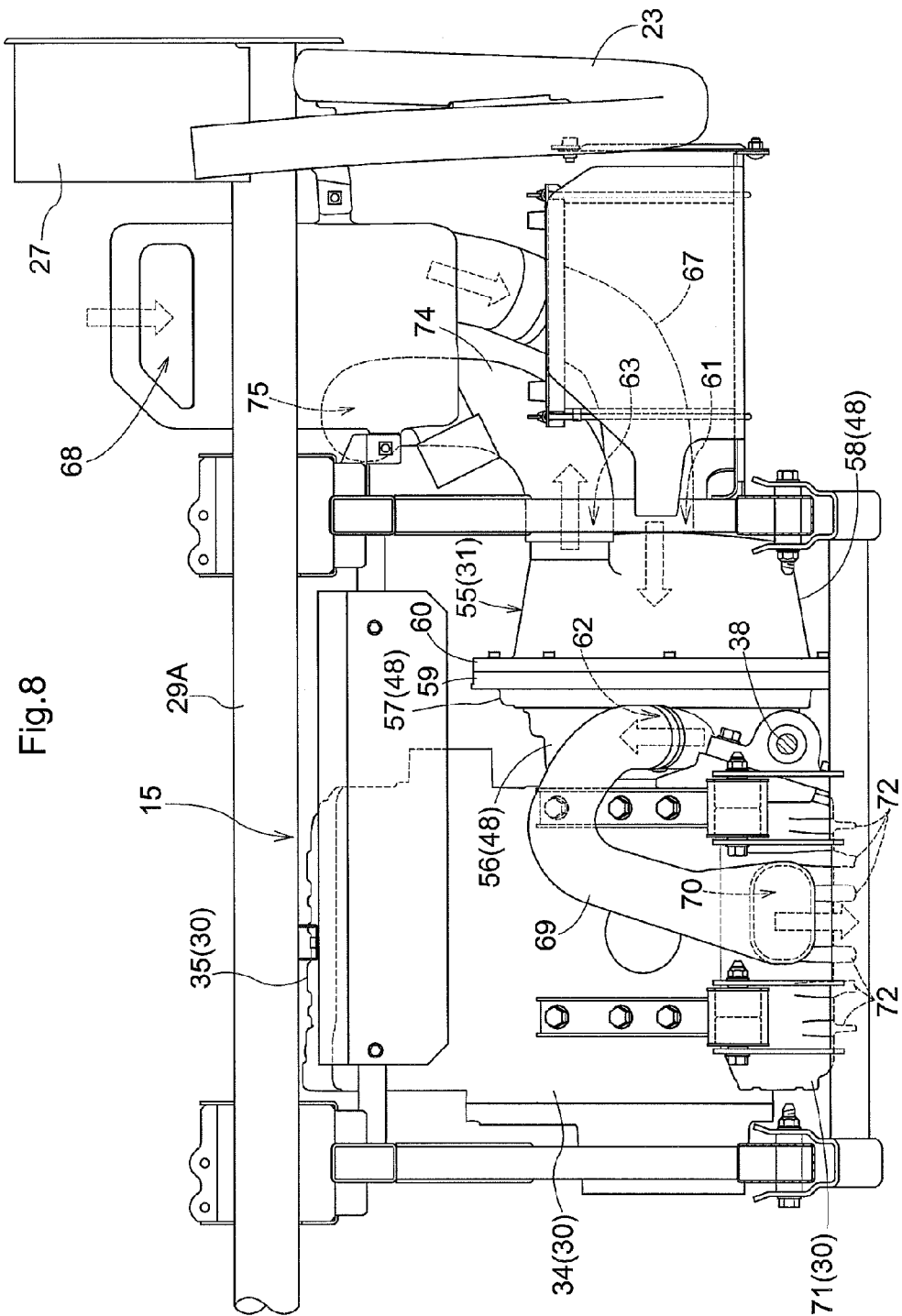
FIG. 8 is a front view showing the belt type stepless speed changer mechanism and its periphery.

The driving section 13 is protected as its periphery being surrounded by a ROPS frame 21. The ROPS frame 21 includes a pair of left and right upper frames 22 having inverted U-shape in the side view and a pair of left and right lower frames 23 having U-shape in the side view. The upper frames 22 and the lower frames 23 are comprised of pipe frames, respectively. The ROPS frame 21 further includes a front upper frame 24 disposed horizontally between front upper portions of the left and right upper frames 22, front connecting members 26 connecting front lower end portions of the upper frames 22 and front upper end portions of the lower frames 23, rear connecting members 27 connecting rear lower end portions of the upper frames 22 and rear upper end portions of the lower frames 23, and so on. Between the left and right upper frames 22, and rearwardly of the driver's seat 16, there are provided a vertically oriented window member 28 having a front-rear oriented face and a vertically oriented protective panel 29 having a front-rear oriented face. As shown in FIGS. 6-8, between the lower end portions of the left and right rear connecting members 27, there is mounted a lateral frame 29A comprised of a laterally oriented pipe frame.

The load-carrying platform 14 shown in FIG. 1, FIG. 2 and FIG. 7 is configured to be switchable between a load-carrying state capable of carrying load and a dumping state capable of dumping load. As the load-carrying platform 14 is pivoted about laterally oriented axis, a front end portion thereof is raised, thus being rendered into the dumping state capable of dumping load from a rear end portion. The state change of the load-carrying platform 14 can be effected by driving of a hydraulic actuator, for instance.

The engine section 15 shown in FIG. 1, FIG. 2 and FIGS. 6-8 includes a water-cooled gasoline engine (to be referred to simply as "engine 30" hereinafter), a dry belt type stepless speed changer mechanism 31 (an example of "stepless speed changer device"), a gear type speed changer mechanism 32, etc.

Figure 3:
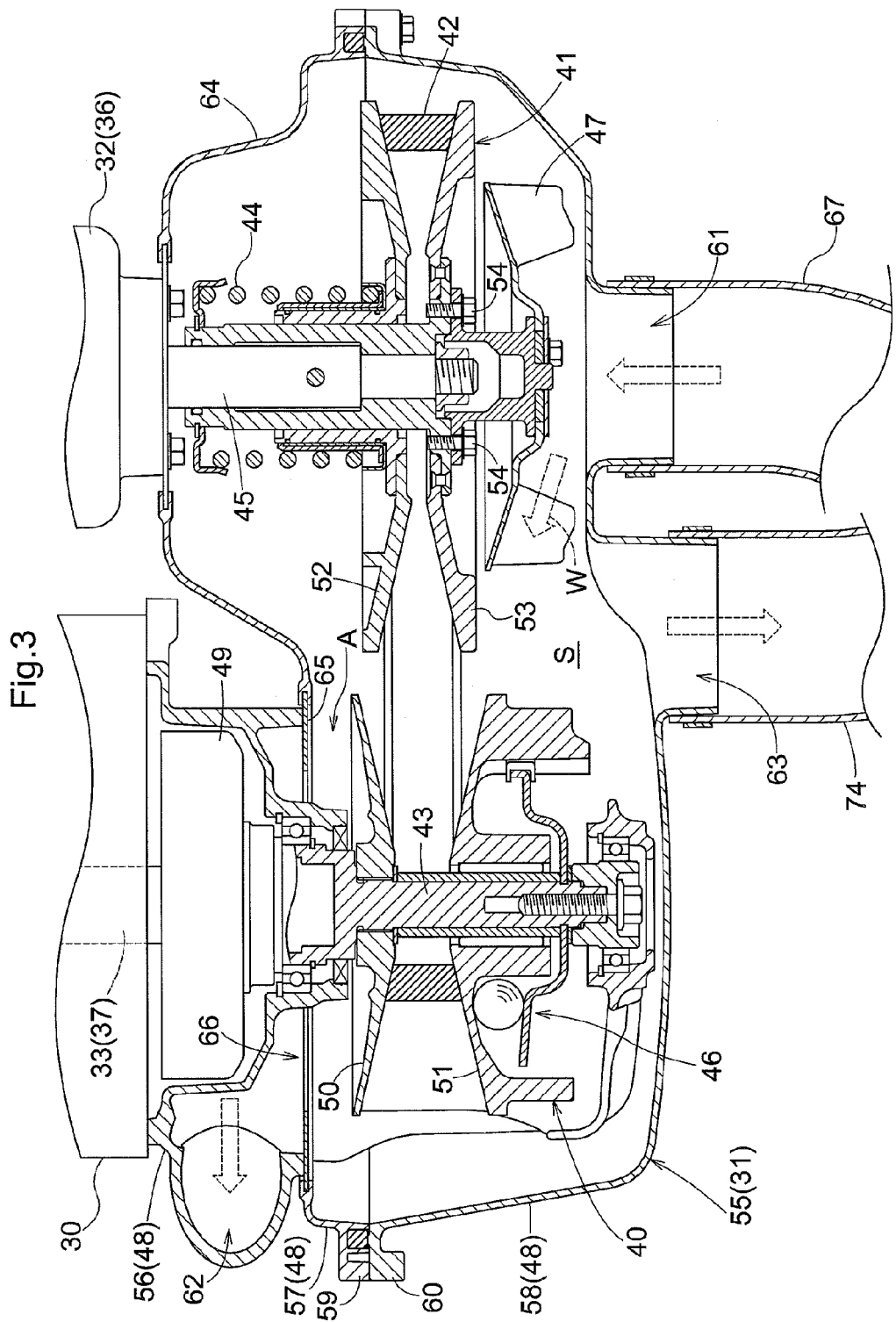
FIG. 3 shows a section in a plan view showing a belt type stepless speed changer mechanism and its periphery.

As shown in FIG. 2 and FIG. 3, the engine 30 includes a crank shaft 33 mounted laterally. As shown in FIG. 1, FIG. 7 and FIG. 8, the engine 30 has a configuration where a cylinder head 35 is connected to a cylinder block 34 to which the crank shaft 33 is supported. The cylinder head 35 is connected under a posture oriented obliquely rearward and upward relative to the cylinder block 34.

As shown in FIG. 2, the gear type speed changer mechanism 32 is accommodated in a transmission case 36. This transmission case 36 is disposed rearwardly of the engine 30. The belt type stepless speed changer mechanism 31 is disposed laterally of the engine 30 and the transmission case 36. As shown in FIG. 3, the crank shaft 33 integrally includes an output shaft 37.

As may be understood from FIG. 1 and FIG. 2, power of the engine 30 is transmitted to the belt type stepless speed changer mechanism 31, in which the power is speed-changed according to a rotational speed of the engine 30. Output of the belt type stepless speed changer mechanism 31 is transmitted to the gear type speed changer mechanism 32. This gear type speed changer mechanism 32 is configured to be capable of switching an output state to a forward first-speed state, a forward second-speed state, a neutral state and a reverse state. Output of the gear type speed changer mechanism 32 is transmitted to the left and right rear wheels 12. Further, output of the gear type speed changer mechanism 32 can be transmitted, if needed, also to the left and right front wheels 11 via a PTO (power takeoff) shaft 38 and a propelling shaft 39. The gear type speed changer mechanism 32 includes a transmission clutch (not shown). When this transmission clutch is engaged, there is provided a state wherein the power is transmitted to the left and right front wheels 11 and the left and right rear wheels 12 (four-wheel drive state). On the other hand, when the transmission clutch is disengaged, there is provided a state wherein the power is transmitted only to the left and right rear wheels 12 (two-wheel drive state).

[Specific Arrangement of Belt Type Stepless Speed Changer Mechanism]

As shown in FIG. 3, the belt type stepless speed changer mechanism 31 (an example of "stepless speed changer device") includes a drive pulley 40 capable of changing belt winding diameter, a driven pulley 41 capable of changing belt winding diameter, and an endless belt 42 (an example of "endless rotary body") formed of e.g. rubber and wound and entrained around the drive pulley 40 and the driven pulley 41.

Further, the belt type stepless speed changer mechanism 31 includes a drive shaft 43 rotatable to rotate the drive pulley 40 therewith, a winding diameter adjusting mechanism 46 for changing belt winding diameter of the drive pulley 40, an input shaft 45 rotatable to rotate the driven pulley 41 therewith, a coil spring 44 exerting an urging force to increase the belt winding diameter for the driven pulley 41, and an air intake fin 47 (corresponding to "fin") rotatable with the driven pulley 41.

The drive pulley 40, the driven pulley 41, the endless belt 42, the drive shaft 43, the winding diameter adjusting mechanism 46, the input shaft 45, the coil spring 44 and the air intake fin 47 are accommodated in an accommodation space S provided inside an accommodating body 48. Namely, the accommodating body 48 encloses the drive pulley 40, the driven pulley 41, the endless belt 42, the drive shaft 43, the winding diameter adjusting mechanism 46, the input shaft 45, the coil spring 44 and the air intake fin 47.

Between the output shaft 37 of the engine 30 and the drive shaft 43, there is interposed a centrifugal clutch 49. This centrifugal clutch 49 is configured to be capable of engaging/disengaging transmission of power of the engine 30 to/from the drive pulley 40. When the rotational speed of the engine 30 is below a set value, the centrifugal clutch 49 is disengaged, so that no power is transmitted from the output shaft 37 of the engine 30 to the drive shaft 43 of the drive pulley 40. On the other hand, when the rotational speed of the engine 30 is greater than the set value, the centrifugal clutch 49 reaches an engaged state, whereby power is transmitted from the output shaft 37 of the engine 30 to the drive shaft 43 of the drive pulley 40.

The drive pulley 40 includes a driving side fixed sheave 50 and a driving side movable sheave 51. The driving side fixed sheave 50 is disposed on a base end side of the drive shaft 43 (the side adjacent the engine 30). The driving side movable sheave 51 is disposed on a leading end side of the drive shaft 43. The winding diameter adjusting mechanism 46 is provided at a projecting end of the drive shaft 43.

The driven pulley 41 includes a driven side movable sheave 52 and a driven side fixed sheave 53. The driven side movable sheave 52 is disposed on a base end side of the input shaft 45 (the side adjacent the transmission case 36). The driven side fixed sheave 53 is disposed on a leading end side of the input shaft 45. The coil spring 44 is disposed between the transmission case 36 and the driven side movable sheave 52 and urges the driven side movable sheave 52 toward a side closer to the driven side fixed sheave 53. The air intake fin 47 is attached to a projecting end of the input shaft 45. The driven pulley 41, as indicated by an arrow R in FIG. 4 and FIG. 5, is rotated to move from the lower side to the upper side at a position opposite the drive pulley 40.

Figure 4:
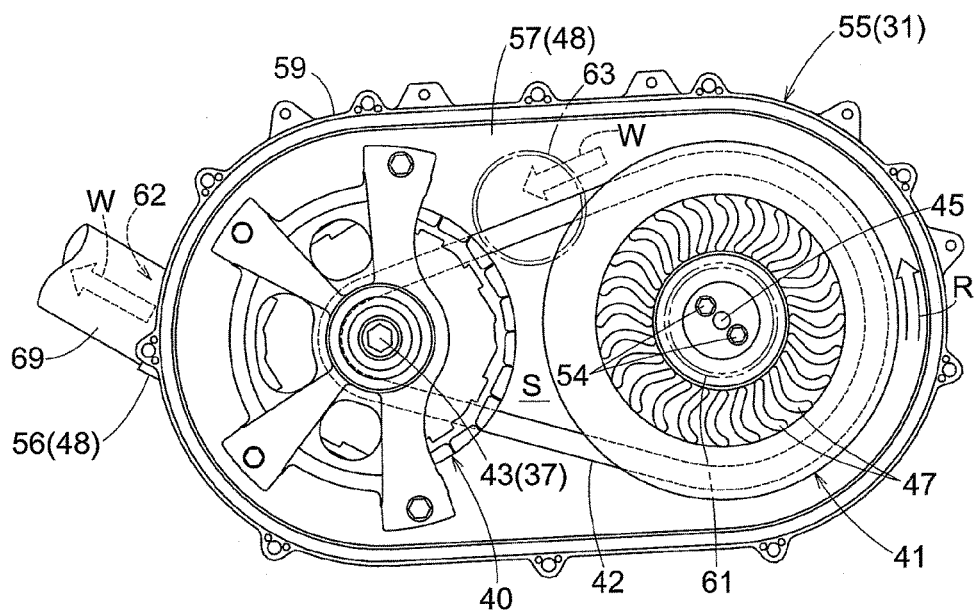
FIG. 4 is a side view showing the belt type stepless speed changer mechanism and its periphery in case a rotational speed of an engine is low.
Figure 5:
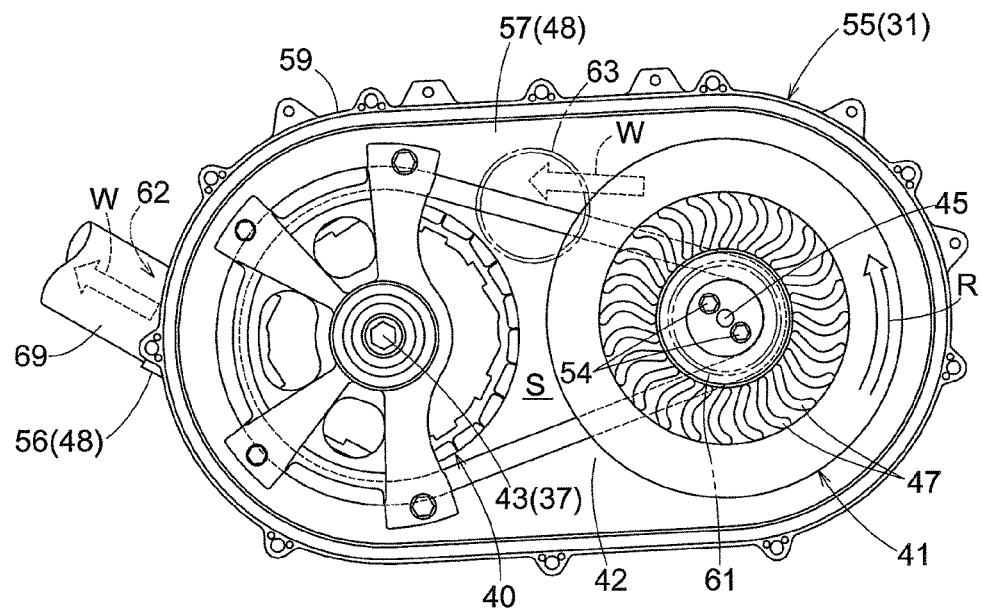
FIG. 5 is a side view showing the belt type stepless speed changer mechanism and its periphery in case a rotational speed of an engine is high.

As shown in FIGS. 3-5, the air intake fin 47 is configured to be capable of generating an air current which flows from the outside to the accommodation space S in association with rotational drive of the driven pulley 41. The air intake fin 47 is connected and supported to the input shaft 45 (the driven side fixed sheave 53 of the driven pulley 41) via a plurality of attaching bolts 54. With attachment or detachment of the attaching bolts 54, change to an air intake fin 47 of a different size can be easily effected.

By an operation on the unillustrated accelerator pedal, the rotational speed of the engine 30 can be increased. As the rotational speed of the engine 30 is increased from a set value, by the function of the winding diameter adjusting mechanism 46, the driving side movable sheave 51 is moved closer to the driving side fixed sheave 50, whereby the belt winding diameter of the drive pulley 40 is increased. In association with this, due to the tension of the endless belt 42, the driven side movable sheave 52 is moved away from the driven side fixed sheave 53, against the urging force of the coil spring 44, whereby the belt winding diameter of the driven pulley 41 is decreased.

Further, in case the rotational speed of the output shaft 37 of the engine 30 is decreased from a high rotational speed, the pressing force provided by the winding diameter adjusting mechanism 46 is decreased, so that due to the urging force of the coil spring 44, the driven side movable sheave 52 is moved closer to the driven side fixed sheave 53, whereby the belt winding diameter of the driven pulley 41 is increased. In association with this, due to the tension of the endless belt 42, the driving side movable sheave 51 is moved away from the driving side fixed sheave 50, against the pressing force of the winding diameter adjusting mechanism 46, whereby the belt winding diameter of the drive pulley 40 is decreased.

In case the rotational speed of the output shaft 37 of the engine 30 is a low rotational speed higher than the set value and a speed reduction ratio provided by the belt type stepless speed changer mechanism 31 becomes greater than 1 (one), as shown in FIG. 4, the driven pulley 41 becomes the speed reducing side relative to the drive pulley 40. This corresponds to a low speed traveling of the traveling vehicle body.

Further, in case the rotational speed of the output shaft 37 of the engine 30 is a high rotational speed higher than the low speed and a speed reduction ratio provided by the belt type stepless speed changer mechanism 31 becomes smaller than 1 (one), as shown in FIG. 5, the driven pulley 41 becomes the speed increasing side relative to the drive pulley 40. This corresponds to a high speed traveling of the traveling vehicle body.

Namely, the higher the rotational speed of the engine 30 than the set value, the higher the rotational speed of the driven pulley 41, and the higher the rotational speed of the air intake fin 47 also, so that the intensity of air current generated in association with driving of the air intake fin 47 becomes higher also.

[Accommodating Body]

As shown in FIG. 3, the accommodating body 48 includes an accommodating case 55 and a clutch case 56.

The accommodating case 55 accommodates the drive pulley 40 (corresponding to "driving rotary body"), the driven pulley 41 (corresponding to "driven rotary body"), and the endless belt 42.

The clutch case 56 is connected to the accommodating case 55 and communicated to this accommodating case 55. The clutch case 56 accommodates the centrifugal clutch 49. The accommodating case 55 includes a case body 57 and a cover body 58.

The case body 57 is supported to the traveling vehicle body side (at least one of the transmission case 36 and the engine 30). The case body 57 is supported to the traveling vehicle body side of the engine 30 and the transmission case 36. The case body 57 is disposed on more inner side of the vehicle body than the drive pulley 40, the driven pulley 41, the endless belt 42, the winding diameter adjusting mechanism 46, the coil spring 44 and the air intake fin 47. To an outer circumferential portion of the case body 57, a main flange face 59 is provided.

The cover body 58 is bolt-connected and detachably supported to the case body 57. The case body 57 is supported to the traveling vehicle body side of the engine 30 and the transmission case 36. The case body 57 is disposed on more outer side of the vehicle body than the drive pulley 40, the driven pulley 41, the endless belt 42, the winding diameter adjusting mechanism 46, the coil spring 44 and the air intake fin 47. To an outer circumferential portion of the cover body 58, an auxiliary flange face 60 is provided.

The case body 57 and the cover body 58 bolt-connect the main flange face 59 of the accommodating case 55 and the auxiliary flange face 60 of the cover body 58 via a sealing member made of rubber or the like.

The clutch case 56 surrounds the centrifugal clutch 49. The clutch case 56 is connected to the cylinder block 34 of the engine 30 and connected also to the case body 57 of the accommodating case 55. The clutch case 56 is disposed at a position sandwiched between the engine 30 and the accommodating case 55.

Adjacent the driven pulley 41 in the cover body 58 of the accommodating case 55, there is provided an inlet 61 capable of introducing air from the outside into the accommodation space S. The air intake fin 47 is disposed adjacent the inlet 61. In a wall face of the clutch case 56 on the side of the engine 30, there is provided a first discharge opening 62 capable of discharging air to the outside from the accommodation space S. At a portion of the cover body 58 of the accommodating body 48 between the drive pulley 40 and the driven pulley 41, there is provided a second discharge opening 63, separately of the first discharge opening 62, the second discharge opening 63 being capable of discharging air from the accommodation space S to the outside.

In a wall face of the case body 57 on the side of the transmission case 36 (rear side), there is provided a bulging portion 64 which bulges to the side opposite the cover body 58 (the transmission case 36 side). On the engine 30 side (front side) of the case body 57, thee is provided a flat vertical wall face 65 disposed under a posture perpendicular to the drive shaft 43.

Between the drive pulley 40 and the vertical wall face 65, there is provided a gap space A through which air flows. The vertical wall face 65 defines therethrough an air communication opening 66 extending through the drive shaft 43. The air communication opening 66 is disposed in the area surrounding the drive shaft 43. Air inside the accommodation space S is caused to flow through the gap space A, and the air communication opening 66 from the drive pulley 40 side to the first discharge opening 62 side.

As shown in FIGS. 2-8, to the inlet 61, one end portion of a hollow air introducing member 67 is connected. As shown in FIG. 2 and FIGS. 6-8, at the other end portion of the air introducing member 67 opposite the inlet 61, there is provided an air introducing opening 68. This air introducing opening 68 is disposed at a rear side portion of the driver's seat 16. More particularly, the air introducing opening 68 is disposed forwardly of the load-carrying platform 14. As shown in FIG. 7, the air introducing opening 68 is opened on the front side of the upper end portion of the air introducing member 67. The air introducing opening 68 is disposed rearwardly of the protective panel 29. The air introducing opening 68 is disposed upwardly of the lateral frame 29A. In this way, in the area around the air introducing opening 68, there are present obstacles that block entrance of dust or the like. Therefore, at the position where the air introducing opening 68 is located, relatively clean air with reduced possibility of intrusion of dust or the like is present. Therefore, inside the air introducing member 67, there is provided no such element such as a dust-proof filter that can be an obstacle against air flow. For this reason, there will occur no resistance by the element against air flow, so there occurs no reduction in the momentum of air fed into the inlet 61.

As shown in FIG. 3, the first discharge opening 62 is disposed on the side opposite the driven pulley 41, relative to the drive pulley 40. As shown in FIGS. 2-8, to this first discharge opening 62, one end portion of a first air drawing member 69 is connected. As shown in FIG. 2 and FIGS. 6-8, at an end of the first air drawing member 69 opposite the first discharge opening 62, there is provided a first air drawing opening 70.

As shown in FIG. 2, FIG. 3 and FIGS. 6-8, to the second discharge opening 63, one end portion of a second air drawing member 74 is connected. At the end portion of the second air drawing member 74 opposite the second discharge opening 63, a second air drawing opening 75 is provided. This second air drawing opening 75 is opened toward the vehicle body rear side.

As shown in FIG. 3, cooling air drawn into the accommodation space S via the inlet 61, by the function of the air intake fin 47 rotatably driven together with the driven pulley 41 cools the inside of the accommodation space S and also flows in the direction of the first discharge opening 62 and in the direction of the second discharge opening 63, respectively. That is, in the accommodation space S of the accommodating body 48, there is provided an air passage W configured to flow the air introduced from the outside from the driven pulley 41 side to the drive pulley 40 side.

In association with driven rotation of the driven pulley 41, the air intake fin 47 generates a negative pressure, and this negative pressure causes the ambient air drawn in via the air introducing opening 68 to be introduced as cooling air to the inside of the accommodating case 55 via the inlet 61. This introduced cooling air flows inside the accommodating case 55 from the driven pulley 41 side to the drive pulley 40 side. In the course of this flow of air, the air comes into contact with the driven pulley 41, the drive pulley 40 and the endless belt 42 to remove heat therefrom, thus cooling these components.

The cooling air that has removed heat from the accommodation space S inside the accommodating case 55 flows through the first discharge opening 62 provided in the clutch case 56 toward the outside of the accommodation space S. Further, excess air of the accommodation space S is discharged via the second discharge opening 63.

The sum of the cross sectional area of the first discharge opening 62 and the cross sectional area of the second discharge opening 63 is set greater than the cross sectional area of the inlet 61. Namely, the air outlet cross sectional area of the accommodation space S is set greater than the air inlet cross sectional area of the same. With this arrangement, it is possible to allow air introduced via the inlet 61 into the accommodation space S to be discharged smoothly via the first discharge opening 62 or the second discharge opening 63, thus preventing reverse flow of the air via the inlet 61 to the outside.

As shown in FIG. 8, the first air drawing opening 70 is opened toward the oil pan 71 disposed at the bottom of the engine 30. The oil pan 71 reserves an amount of engine oil. In the bottom face of the oil pan 71, there are provided heat discharging fins 72 in the form of folds. With provision of such heat discharging fins 72, cooling efficiency of the oil pan 71 can be improved.

With a multi-purpose vehicle, there occur relatively many occasions causing the vehicle body to travel at a high speed for traveling. At the time of such high speed traveling of the vehicle body, the rotational speed of the engine 30 is relatively high. So, as shown in FIG. 5, in the belt type stepless speed changer mechanism 31, there is a tendency of the rotational speed of the driven pulley 41 becoming higher than the rotational speed of the drive pulley 40. And, the air intake fin 47 for generating an air current is rotatable in unison with the driven pulley 41. For this reason, at the time of high-speed traveling of the vehicle body which is used with relatively high frequency, the rotational speed of the air intake fin 47 becomes higher, so that an amount of air introduced via the inlet 61 is increased, thus realizing efficient cooling of the belt type stepless speed changer mechanism 31.

Also, when the rotational speed of the engine 30 becomes a high speed, the air intake fin 47 rotatable in unison with the driven pulley 41 is rotated at a high speed, so that an amount of air introduced via the inlet 61 into the accommodation space S is increased and an amount of air discharged via the first discharge opening 62 is increased also. When the rotational speed of the engine 30 becomes a high speed, the temperature of the engine oil reserved in the oil pan 71 becomes a relatively high temperature. That is, as the engine oil becomes a condition of high temperature, the amount of air blown against the oil pan 71 of the engine 30 is increased. Thus, cooling of the engine oil can be effected in a rational manner.

Other Embodiments

Next, other embodiments of the present invention will be explained. The foregoing embodiment and the other embodiments can be combined as desired as long as no conflict occurs therebetween. Incidentally, it is understood that the scope of the present invention is not to be limited to the contents of these embodiments.

[Air Introduction Utilizing Cylindrical Lower Frame]

Figure 9:
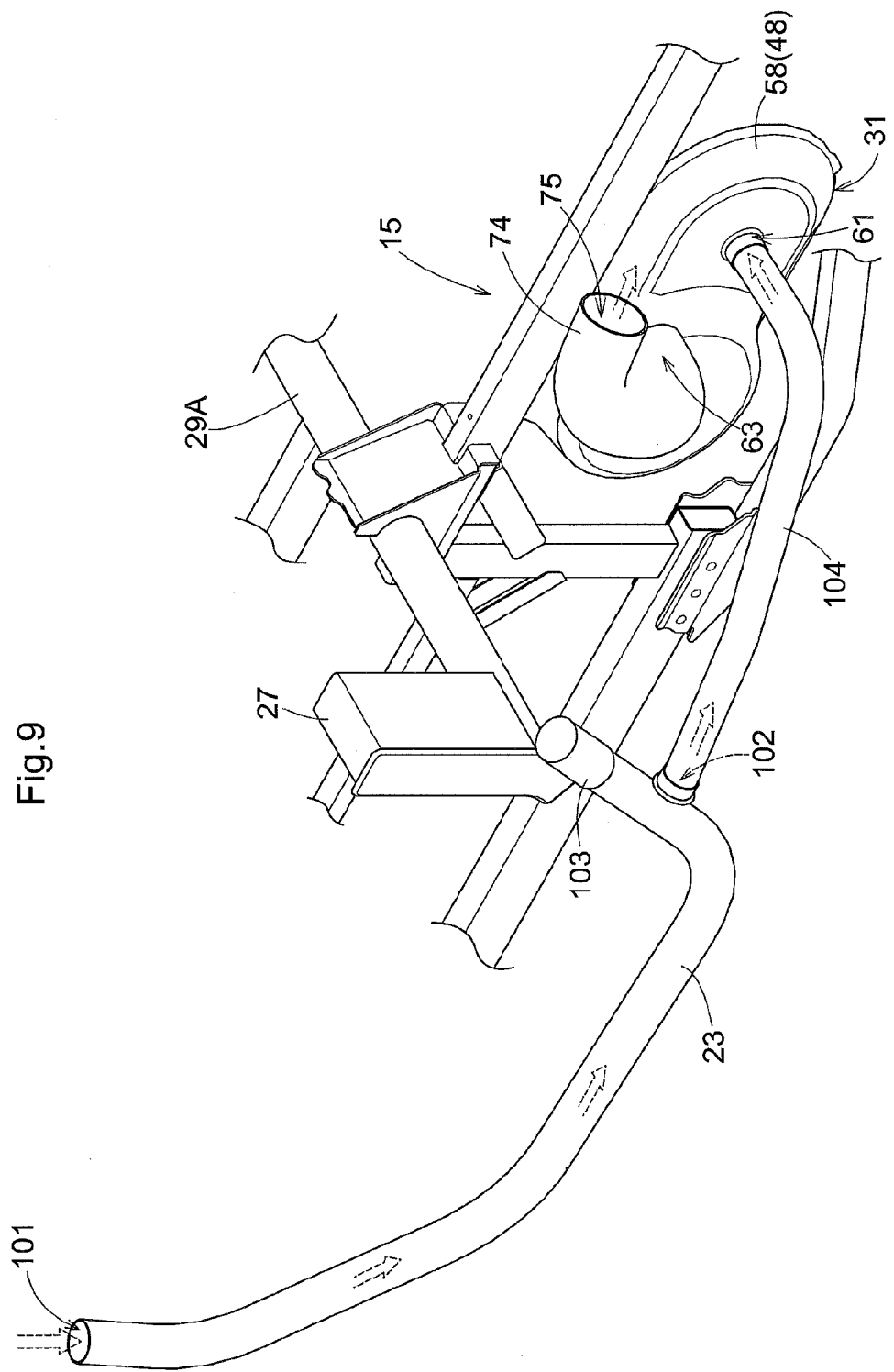
FIG. 9 is a perspective view showing an air intake passage extending to the belt type stepless speed changer mechanism in a further embodiment.

(1) In the foregoing embodiment, there was shown an example in which air is introduced from the air introducing opening 68 disposed at a position rearwardly of the driver's seat 16 to the inlet 61 via the air introducing member 67. The invention is not limited thereto. For instance, as shown in FIG. 9, an air drawing member can be provided through utilization of the lower frame 23 constituted of a pipe frame. More particularly, a front side end face of the lower frame 23 is provided as an air introducing opening 100 and a rear side end face of the lower frame 23 is closed by a closing member 103 such as a cap. And, this air introducing opening 100 is located within a space surrounded by a front lid 73 (see FIG. 1) where there is present relatively clean air with less mixing of dust or the like. And, a communication opening 102 is opened at a lateral portion adjacent the rear end portion of the lower frame 23. And, the communication opening 102 and the inlet 61 are connected to each other via a hollow member 104 such as a molded hose or the like having a hollow structure. With this arrangement, when the air intake fin 47 is driven, clean air will be drawn into the lower frame 23 via the air introducing opening 100 by the negative pressure and the clean air will be introduced from the communication opening 102 via the hollow member 104 into the inlet 61. With this, the lower frame 23, which is an existing structural frame member, can be utilized as a cooling arrangement for the belt type stepless speed changer mechanism 31. Consequently, co-utilization of a component is made possible and also clean air with minimal mixing of dust or the like can be introduced as cooling air for the belt type stepless speed changer mechanism 31.

(2) In the foregoing embodiment, there was shown the drive pulley 40 having no air current generating fin. However, the invention is not limited thereto. For instance, there can be provided an air discharging fin rotatable in unison with the drive pulley 40. With provision of such air discharging fin in the drive pulley 40, air discharge from the first discharge opening 62 to the outside can be promoted.

(3) In the foregoing embodiment, there was shown the belt type stepless speed changer mechanism 31 using the endless belt 42 made of rubber as the "endless rotary body". The invention is not limited thereto. For instance, it is possible to employ other type of belt speed changer mechanism using an endless belt made of metal as the "endless rotary body" or a chain type stepless speed changer mechanism using a plurality of chains as the "endless rotary body".

(4) In the foregoing embodiment, there was shown the example in which the heat discharging fin 72 is provided in the oil pan 71. The invention is not limited thereto. It is possible to employ other oil pan having no heat discharging fin 72.

(5) In the foregoing embodiment, there was shown the example in which the first discharge opening 62 and the second discharge opening 63 are provided in the accommodating body 48. The invention is not limited thereto. For instance, it is possible to increase the cross sectional area of the first discharge opening 62 and to omit the second discharge opening 63 from the accommodating body 48. In this case, it is preferred that the cross sectional area of the first discharge opening 62 be greater than the cross sectional area of the inlet 61.

(6) In the foregoing embodiment, there was shown the example in which the case body 57 is supported to the engine 30 and the transmission case 36. The invention is not limited thereto. The case body 57 can be supported to the engine 30 only or can be supported to the transmission case 36 only.

(7) In the foregoing embodiment, there was shown a multi-purpose vehicle as an example of work vehicle. The invention is not limited thereto. Other types of work vehicle such as a tractor, a grass mower, etc. are also possible.

The invention claimed is:

1. A work vehicle comprising:
an engine;
a stepless speed changer device having a drive pulley receiving input of power of the engine, a driven pulley, and an endless rotary body wound around and entrained between the the drive pulley and the driven pulley; and
an accommodating body having an accommodation space for accommodating the drive pulley, the driven pulley and the endless rotary body;
wherein the accommodation space includes an air passage for causing air introduced from the outside to flow from the driven pulley side to the drive pulley side to be eventually discharged to the outside,
wherein the accommodating body includes a first discharge opening capable of discharging air from the accommodation space to the outside,
wherein the first discharge opening is disposed on a side opposite the driven pulley relative to the drive pulley,
wherein at a portion of the accommodating body located between the drive pulley and the driven pulley, there is provided a second discharge opening separately of the first discharge opening, the second discharge opening being capable of discharging air from the accommodation space to the outside, and
wherein the first discharge opening and the second discharge opening are provided parallel with each other between the accommodating space and the outside of the accommodating space.

2. The work vehicle according to claim 1, wherein:
adjacent the driven pulley inside the accommodating body, there is provided an inlet capable of introducing air from the outside into the accommodation space; and
the work vehicle further comprises a fin disposed adjacent the inlet and capable of generating an air current flowing from the outside to the accommodation space in association with rotational drive of the driven pulley.

3. The work vehicle according to claim 2, further comprising:
a driving section having a driver's seat; and
an air introducing member connected to the inlet; and
wherein an air introducing opening included in the air introducing member is disposed at a portion rearwardly of the driver's seat.

4. The work vehicle according to claim 1, further comprising:
an air drawing member connected to the first discharge opening;
wherein the air drawing member includes an air drawing opening at an end opposite the first discharge opening, the air drawing opening being opened toward an oil pan of the engine.

5. The work vehicle according to claim 1, wherein:
the accommodating body includes an accommodating case for accommodating the drive pulley, the driven pulley and the endless rotary body, and a clutch case communicated to the accommodating case and configured to accommodate a centrifugal clutch capable of engaging/disengaging transmission of power of the engine to the drive pulley; and
the first discharge opening is provided in the clutch case.

6. A work vehicle comprising:
an engine;
a stepless speed changer device having a drive pulley receiving input of power of the engine, a driven pulley, and an endless rotary body wound around and entrained between the the drive pulley and the driven pulley; and
an accommodating body having an accommodation space for accommodating the drive pulley, the driven pulley and the endless rotary body;
wherein the accommodation space includes an air passage for causing air introduced from the outside to flow from the driven pulley side to the drive pulley side to be eventually discharged to the outside,
wherein the accommodating body includes a first discharge opening capable of discharging air from the accommodation space to the outside,
wherein the first discharge opening is disposed on a side opposite the driven pulley relative to the drive pulley,
wherein an air drawing member is connected to the first discharge opening,
wherein the air drawing member includes an air drawing opening at an end opposite the first discharge opening, the air drawing opening being opened toward an oil pan provided in a bottom portion of the engine to direct air towards the oil pan.

* * * * *

UNITED STATES PATENT AND TRADEMARK OFFICE
CERTIFICATE OF CORRECTION

PATENT NO.          : 9,909,659 B2
APPLICATION NO.     : 15/157512
DATED               : March 6, 2018
INVENTOR(S)         : Hiroki Bessho et al.

It is certified that error appears in the above-identified patent and that said Letters Patent is hereby corrected as shown below:

In the Claims

Column 11, Line 36, Claim 1, delete "the the" and insert -- the --

Column 12, Line 38, Claim 6, delete "the the" and insert -- the --

Signed and Sealed this
Twenty-second Day of May, 2018

Andrei Iancu
*Director of the United States Patent and Trademark Office*